US 6,718,464 B2

(12) United States Patent
Cromer et al.

(10) Patent No.: US 6,718,464 B2
(45) Date of Patent: Apr. 6, 2004

(54) METHOD AND SYSTEM FOR CUSTOMIZING A CLIENT COMPUTER SYSTEM CONFIGURATION FOR A CURRENT USER USING BIOS SETTINGS DOWNLOADED FROM A SERVER (75) Inventors: Daryl Carvis Cromer, Apex, NC (US); Eric Richard Kern, Durham, NC (US); Howard Jeffrey Locker, Cary, NC (US); David Rhoades, Apex, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/768,066

(22) Filed: Jan. 23, 2001

(65) Prior Publication Data
US 2002/0099934 A1 Jul. 25, 2002

(51) Int. Cl.⁷ .............................................. G06F 9/445
(52) U.S. Cl. .......................................... 713/2; 709/222
(58) Field of Search ....................... 713/1, 2; 709/220, 709/222

(56) References Cited

U.S. PATENT DOCUMENTS

| | | | |
|---|---|---|---|
| 5,230,052 A | * | 7/1993 | Dayan et al. .................. 713/2 |
| 5,694,583 A | | 12/1997 | Williams et al. |
| 5,732,268 A | | 3/1998 | Bizzarri |
| 5,802,363 A | | 9/1998 | Williams et al. |
| 5,933,652 A | | 8/1999 | Chen et al. |
| 5,978,912 A | | 11/1999 | Rakavy et al. |
| 5,987,536 A | | 11/1999 | Johnson et al. |
| 6,633,976 B1 | * | 10/2003 | Stevens ........................ 713/2 |

FOREIGN PATENT DOCUMENTS

GB 2 311 390 A 9/1997

* cited by examiner

Primary Examiner—Thomas M. Heckler
(74) Attorney, Agent, or Firm—Bracewell & Patterson, LLP; Carlos Munoz-Bustamante (57) ABSTRACT A method and system are disclosed for dynamically loading selected BIOS modules and settings from a server computer system to a client computer system according to an identity of a user who is currently utilizing the client computer system. The client computer system is coupled to a server computer system via a network. Selected BIOS modules and settings are associated with a particular user. These BIOS modules and settings are those preferred by the particular user to use in order to customize the client computer system when the client computer system is used by the particular user. The associations among the particular user and the selected BIOS modules and settings are stored in the server computer system. The selected BIOS modules and settings are downloaded from the server computer system to the client computer system when the particular user causes the client computer system to start booting, i.e. when the particular user is the current user. The client computer system is then booted utilizing these downloaded BIOS modules and settings. The client computer system is booted utilizing BIOS modules and settings received from the server computer system in order to customize the client computer system according to the current user's preferences.

20 Claims, 5 Drawing Sheets

METHOD AND SYSTEM FOR CUSTOMIZING A CLIENT COMPUTER SYSTEM CONFIGURATION FOR A CURRENT USER USING BIOS SETTINGS DOWNLOADED FROM A SERVER

BACKGROUND OF THE INVENTION

1. Field of the Invention

The present invention relates in general to data processing systems and, in particular, to a data processing system and method for customizing a client computer system configuration for a current user using BIOS settings and modules downloaded from a server computer system. Still more particularly, the present invention relates to a data processing system and method for customizing a client computer system configuration for a current user using BIOS settings and modules downloaded from a server computer system, wherein the BIOS settings and modules are selected according to a unique user identifier which identifies the current user.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's Net Vista series, Aptiva series, and Intellistation series.

A computer system requires a basic input/output system (BIOS) in order to operate. The BIOS is code that controls basic hardware operations, such as interactions with disk drives, hard drives, and the keyboard.

When a computer is reset or initially powered-on, a boot process begins. First, POST begins executing. POST is an initialization code which configures the system utilizing initialization settings stored in storage, such as CMOS storage. Once POST has configured the system, BIOS then controls the basic operation of the hardware utilizing the hardware as it was configured by POST. The boot process is complete once an operating system has been handed control of the system. In order for the boot process to be complete, POST must complete its execution.

POST and BIOS are both typically stored as a single flash image in a storage device such as a flash memory. This image is commonly called the "boot code". BIOS includes base modules which are the minimum required in order to properly boot a computer system. Other, optional modules may also be selected. These optional modules may include modules which will permit a privileged access security, updates received via a radio frequency signal, and/or the ability to boot from a USB device.

In addition, a computer system may be customized by a user according to that user's preferences. For example, a user may select a desktop layout, WEB preferences, a preferred boot sequence, passwords, and other information. These settings are typically stored in CMOS on the computer system's planar.

In today's computing environment, users may frequently use more than one client computer system. Therefore a need exists for causing any client computer system on a network to boot utilizing a user's customized BIOS modules and settings to configure the client to boot according to the current user's preferences.

SUMMARY OF THE INVENTION

A method and system are disclosed for dynamically loading selected BIOS modules and settings from a server computer system to a client computer system according to an identity of a user who is currently utilizing the client computer system. The client computer system is coupled to a server computer system via a network. Selected BIOS modules and settings are associated with a particular user. These BIOS modules and settings are those preferred by the particular user to use in order to customize the client computer system when the client computer system is used by the particular user. The associations among the particular user and the selected BIOS modules and settings are stored in the server computer system. The selected BIOS modules and settings are downloaded from the server computer system to the client computer system when the particular user causes the client computer system to start booting, i.e. when the particular user is the current user. The client computer system is then booted utilizing these downloaded BIOS modules and settings. The client computer system is booted utilizing BIOS modules and settings received from the server computer system in order to customize the client computer system according to the current user's preferences.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–6 of the drawings, like numerals being used for like and corresponding parts of the accompanying drawings.

The present invention is a method and system for dynamically loading selected BIOS modules and settings from a server computer system to a client computer system according to an identity of a user who is currently utilizing the client computer system. Each potential user of the client computer system is assigned a unique user identifier which identifies only that particular user. The user identifier is preferably stored on a smart card which is kept by the user identified by the user identifier. Thereafter, whenever the user boots any client computer system which is coupled to a server, the client booted by the user will be configured according to that user's preferences. Therefore, the user may boot any client computer system and have that client configured as if the client were the user's own computer system. The client will boot according to the preferences of the current user.

A client computer system utilizes a base BIOS to boot the client. In addition, one or more of multiple different optional BIOS modules may be selected by a user in order to customize the client. Further, the user will have particular BIOS settings which further specify the configuration of the client computer system. These BIOS settings, any selected optional BIOS modules, and the base BIOS are used to boot the client.

In order to customize the client, when the user boots the client, the client determines which user initiated the boot by reading the user's unique identifier from the user's smart card. The client then transmits this user identifier to the server computer system.

The server computer system maintains a lookup table which lists the BIOS modules and settings for each potential user. The BIOS modules and settings are each associated with a user identifier. When the server receives a user identifier, the server uses the lookup table to locate the user identifier, and then determine which optional BIOS modules and what BIOS settings are associated with the identifier. The server then retrieves the BIOS modules associated with the received user identifier and transmits the selected BIOS modules and BIOS settings to the client.

The client may then boot from the BIOS modules and BIOS settings received from the server. In this manner, the client will boot from the settings downloaded from the server instead of the BIOS settings saved locally within the client's CMOS.

Figure 1:
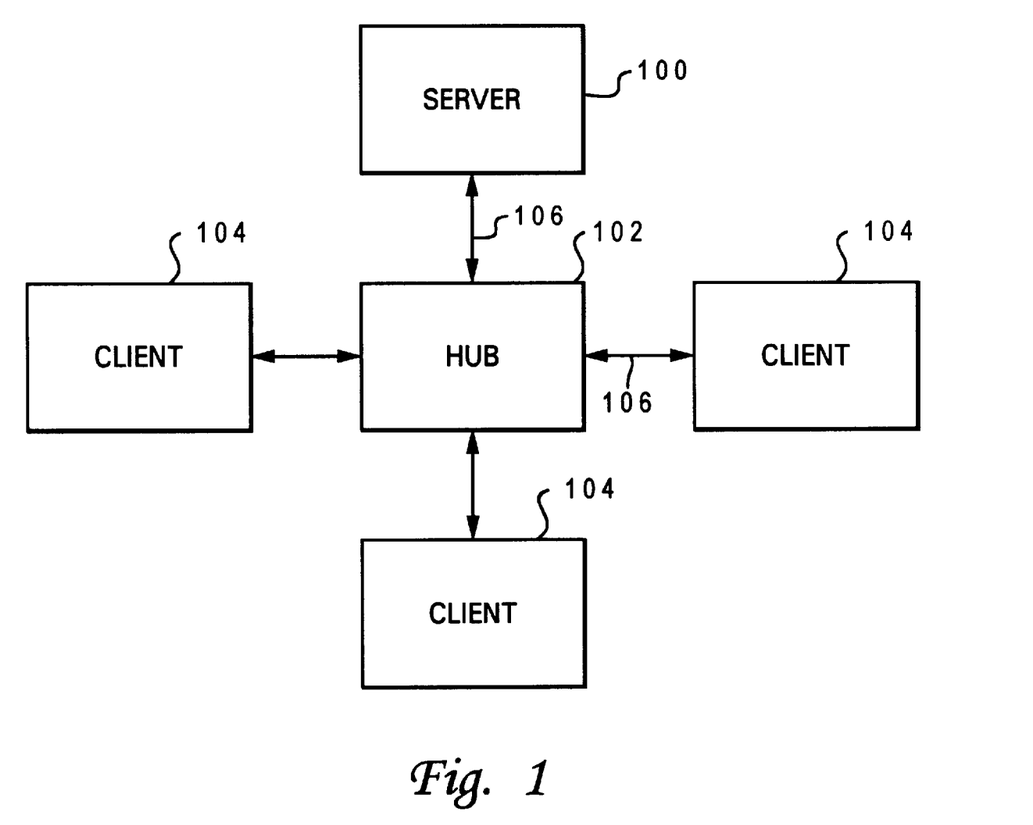
FIG. 1 illustrates a pictorial representation of a data processing system including a plurality of client computer systems coupled to a server computer system utilizing a network and a hub in accordance with the method and system of the present invention.

FIG. 1 illustrates a pictorial representation of a network including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client computer systems 104 also connect to hub 102 through respective LAN busses 106. The preferred form of the network conforms to the Ethernet specification and uses such hubs and busses. It will be appreciated, however, that other forms of networks may be utilized to implement the invention.

Figure 2:
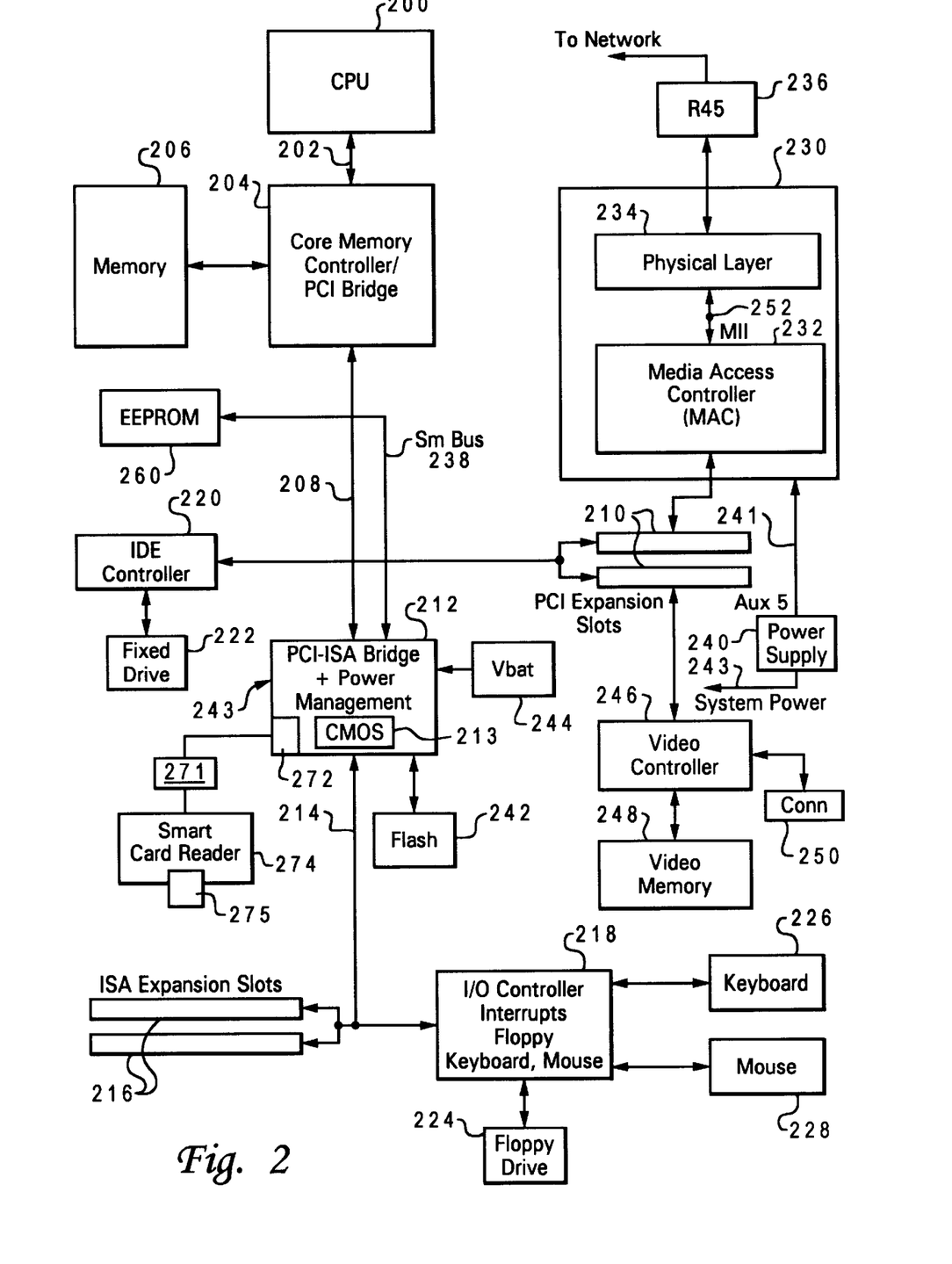
FIG. 2 depicts a more detailed pictorial representation of either a client or server computer system in accordance with the method and system of the present invention.

FIG. 2 depicts a more detailed pictorial representation of either a client or a server computer system in accordance with the method and system of the present invention. Client computer system 104 includes a planar 201 (also commonly called a motherboard or system board) which is mounted within client 104 and provides a means for mounting and electrically interconnecting various components of client 104 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system. Base BIOS modules are stored in flash 242. In addition, BIOS settings used to configure the client during the boot are stored in flash 242.

Client computer system 104 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 104 through connector 250.

Computer system 104 includes a power supply 240 which supplies full normal system power 243, and has an auxiliary power main AUX 5 241 which supplies full time power to the power management logic 212 and to network adapter 230.

In accordance with the present invention, a storage device 260 is coupled to PCI-ISA bridge 212 utilizing a system management (SM) bus 238. Storage device is utilized to store a default unique user identifier. Storage device is preferable implemented utilizing an electronically erasable programable read only memory (EEPROM). System management bus 238 is a two-wire, low speed, serial bus used to interconnect management and monitoring devices. Those skilled in the art will recognize that storage device 260 may be coupled to another bus within planar 201.

Client 104 also includes a network adapter 230. Network adapter 230 includes a physical layer 234 and a media access controller (MAC) 232 coupled together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

Network adapter 230 may be plugged into one of the PCI connector slots 210 (as illustrated) or one of the ISA connector slots 216 in order to permit client 104 to communicate with server 100 utilizing a communication link 106. MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with the address of MAC 232, and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236. Physical layer 234 is also responsible for wave shaping and provides analog voltages. In a preferred embodiment, physical layer 234 is implemented utilizing an Integrated Services chip ICS-1890.

Physical layer 234 includes auto-negotiation logic that serves three primary purposes. First, it determines the capabilities of client 104. Second, it advertises its own capabilities to server 100. And, third, it establishes a connection with server 100 using the highest performance connection technology.

Smart card 275 is inserted into smart card reader 274, which is connected to USB connector 271 on planer. USB connector 271 is connected to USB host controller 272, which is imbedded in bridge 212.

Figure 3:
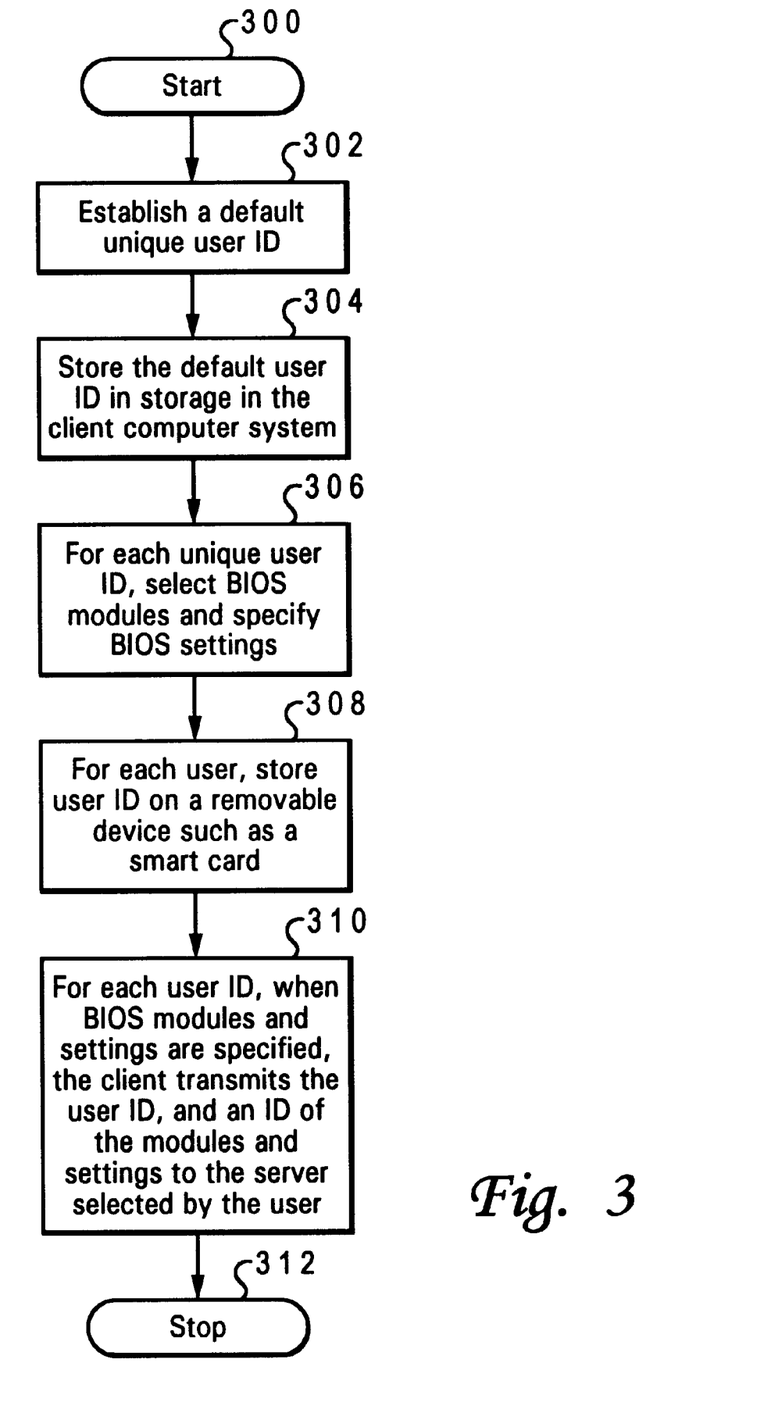
FIG. 3 illustrates a high level flow chart which depicts each user specifying particular BIOS modules and settings to use to boot a client when this user is utilizing the client in accordance with the method and system of the present invention.

FIG. 3 illustrates a high level flow chart which depicts each user specifying particular BIOS modules and settings to use to boot a client when this user is utilizing the client in accordance with the method and system of the present invention. The process starts as depicted by block 300 and thereafter passes to block 302 which illustrates establishing a default unique user identifier. A unique user identifier uniquely identifies a particular user. The default unique user identifier does not identify any particular user. Next, block 304 depicts storing the default user identifier in storage in the client computer system. The process then passes to block 306 which illustrates selecting BIOS modules and specifying BIOS settings for each unique user identifier. Preferably, the first time a new user utilizes a client, the client will determine the BIOS settings and BIOS modules selected by the user to boot the client. Block 308, then, depicts storing a user's unique identifier on a removable device, such as a smart card, for each user. Next, block 310 illustrates the client transmitting an identification of these BIOS modules and settings and the user identifier used to selected the modules and settings to the server. The process then terminates as illustrated by block 312.

Figure 4:
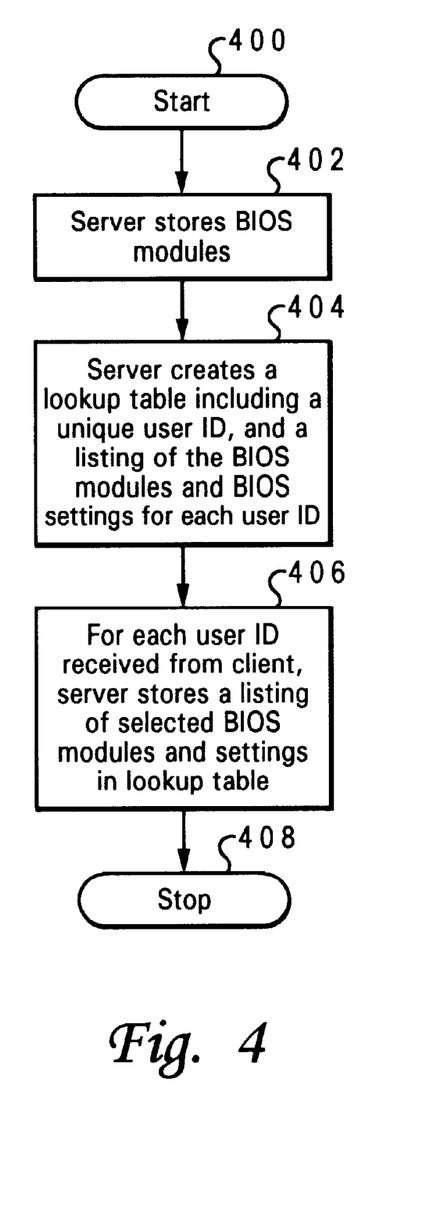
FIG. 4 depicts a high level flow chart which illustrates a server computer system creating a table which maintains a listing of BIOS modules and BIOS settings to be used for each unique user identifier in accordance with the method and system of the present invention.

FIG. 4 depicts a high level flow chart which illustrates a server computer system creating a table which maintains a listing of BIOS modules and BIOS settings to be used for each unique user identifier in accordance with the method and system of the present invention. The process starts as depicted by block 400 and thereafter passes to block 402 which illustrates the server storing BIOS modules. Next, block 404 depicts the server creating a lookup table. Each entry in the lookup table will identify a unique user identifier and the BIOS modules and settings specified to be used for that user identifier. Block 406, then, illustrates the server storing a listing for each user identifier of the selected BIOS modules and settings. The process then terminates as depicted by block 408.

Figure 5:
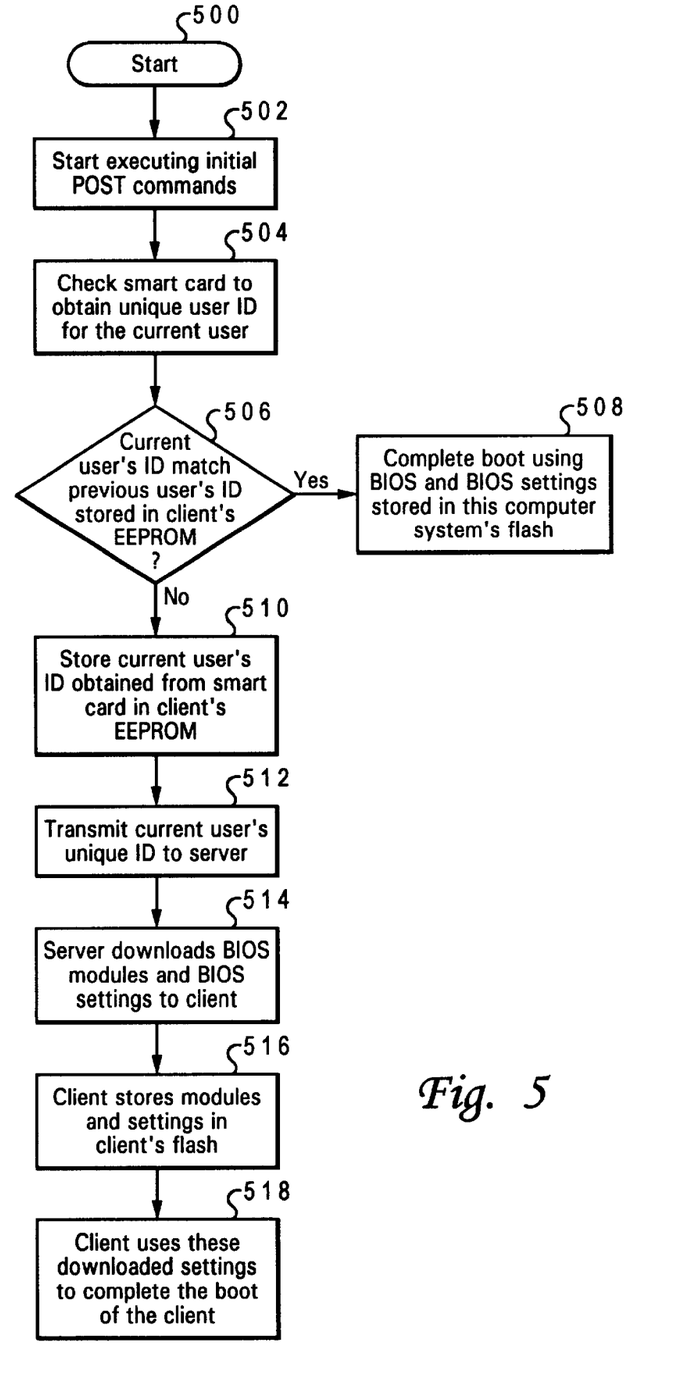
FIG. 5 illustrates a high level flow chart which depicts a client computer system receiving and using BIOS modules and settings selected for a particular user in accordance with the method and system of the present invention.

FIG. 5 illustrates a high level flow chart which depicts a client computer system receiving and using BIOS modules and settings selected for a particular user in accordance with the method and system of the present invention. The process starts as depicted by block 500 and thereafter passes to block 502 which illustrates a client computer system starting the executing of initial POST commands. Next, block 504 depicts the client checking a smart card, if one is inserted into the client, to obtain a unique user identifier stored on the smart card. Each user may have the user's unique user identifier stored on a device such as a smart card so that the user could use any client and have that client be configured to the user's preferences. Block 506, then, illustrates a determination of whether or not the previous user's identifier is the same as the current user's identifier. If the two identifiers match, the process passes to block 508 which depicts the client completing its boot process using the BIOS modules and settings stored in the client's flash.

Referring again to block 506, if a determination is made that the current user's identifier is different from the previous user's identifier, the process passes to block 510 which illustrates the client storing the current user's identifier obtained from the smart in the client's EEPROM storage 260. Next, block 512 depicts the client transmitting the current user's identifier to the server. Thereafter, block 514 illustrates the server downloading the BIOS modules and settings for this user to the client. The process then passes to block 516 which depicts the client storing these modules and settings in flash 242. Thereafter, block 518 illustrates the client using these downloaded modules and setting to complete the boot of the client.

Figure 6:
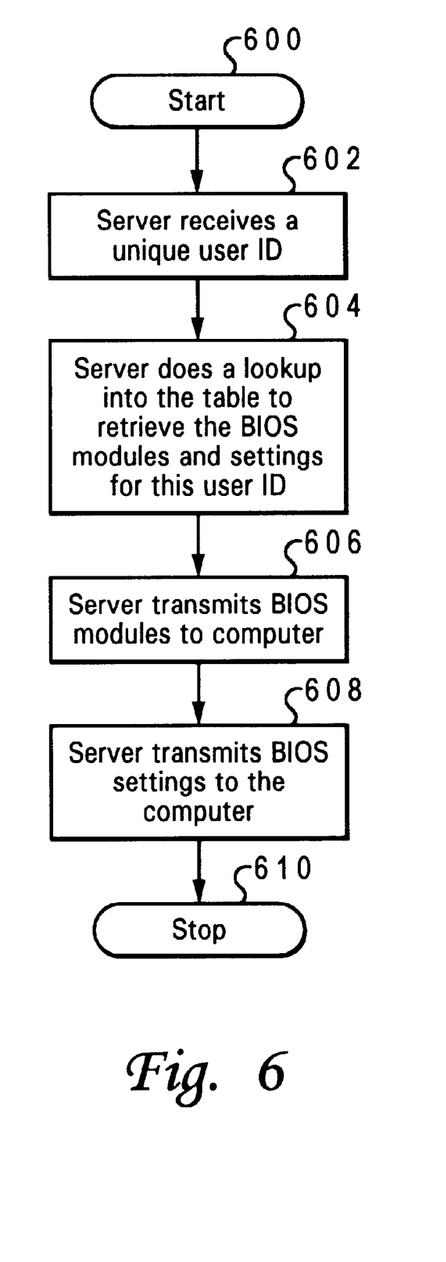
FIG. 6 depicts a high level flow chart which illustrates a server determining and transmitting BIOS modules and settings specified to be used for a particular unique user identifier in accordance with the method and system of the present invention.

FIG. 6 depicts a high level flow chart which illustrates a server determining and transmitting BIOS modules and settings specified to be used for a particular unique user identifier in accordance with the method and system of the present invention. The process starts as depicted at block 600 and thereafter passes to block 602 which illustrates the server receiving a unique user identifier. Next, block 604 depicts the server executing a lookup into the table to retrieve the BIOS modules and settings specified for this user. Block 606, then, illustrates the server transmitting the BIOS modules determined from the lookup table to the client. Thereafter, block 608 depicts the server transmitting the BIOS settings determined from the lookup table to the client. The process then terminates as depicted by block 610.

While a preferred embodiment has been particularly shown and described, it will be understood by those skilled in the art that various changes in form and detail may be made therein without departing from the spirit and scope of the present invention.

What is claimed is:

1. A method for dynamically loading selected BIOS modules and settings from a server computer system to a client computer system according to an identity of a user who is currently utilizing said client computer system, said client computer system being coupled to a server computer system via a network, said method comprising the steps of:

associating a selected plurality of a plurality of BIOS modules and a particular set of BIOS settings with a particular user, wherein said selected plurality of said plurality of BIOS modules and said particular set of BIOS settings are preferred by said particular user to customize said client computer system when said client computer system is used by said particular user;

storing said associations in said server computer system;

downloading said selected plurality of said plurality of BIOS modules and said particular set of BIOS settings from said server computer system to said client computer system when said particular user causes said client computer system to start booting, wherein said particular user is a current user of said client computer system; and booting said client computer system utilizing said downloaded BIOS modules and settings, wherein said client computer system is booted utilizing BIOS modules and settings received from said server computer system to customize said client computer system according to said particular user's preferences.

2. The method according to claim 1, further comprising the steps of:

establishing a unique user identifier which identifies said particular user; and storing said associations in said server computer system utilizing said user identifier.

3. The method according to claim 1, further comprising the step of storing said plurality of BIOS modules on said server computer system.

4. The method according to claim 1, further comprising the steps of:

for each potential user of said client computer system, establishing a unique user identifier which uniquely identifies each potential user;

for said each potential user of said client computer system, associating a selected plurality of said plurality of BIOS modules and a particular set of BIOS settings with said each potential user; and for said each potential user, storing said associations in said server computer system utilizing said user identifier for each potential user.

5. The method according to claim 4, further comprising the steps of:

establishing a lookup table in said server computer system for maintaining a listing of user identifiers, and selected BIOS modules and BIOS settings associated with each user identifier; and for said each potential user, storing said associations in said lookup table utilizing said user identifier.

6. The method according to claim 1, further comprising the step of establishing a lookup table in said server computer system for maintaining a listing of user identifiers, and selected BIOS modules and BIOS settings associated with each user identifier.

7. The method according to claim 1, further comprising the steps of:

establishing a unique user identifier which identifies each potential user of said client computer system; and for each potential user, storing said unique user identifier on a removable device.

8. The method according to claim 7, further comprising the step of for each potential user, storing said unique user identifier on a smart card.

9. The method according to claim 1, further comprising the steps of:

determining a last user of said client computer system utilizing a user identifier stored in said client;

determining a current user of said client computer system utilizing a user identifier obtained from a smart card inserted into said client, wherein said user identifier of said current user is stored on said smart card;

determining whether said current user is the same as said last user; and in response to a determination that said current user is different from said last user, downloading BIOS modules and settings preferred by said current user.

10. The method according to claim 9, further comprising the steps of:

in response to a determination that said current user is different from said last user, said client computer system transmitting a unique user identifier which identifies said current user to said server computer system;

said server computer system determining BIOS modules and settings preferred by said current user;

said server computer system transmitting said BIOS modules and settings to said client computer system; and said client computer system booting utilizing said BIOS modules and settings.

11. A system for dynamically loading selected BIOS modules and settings from a server computer system to a client computer system according to an identity of a user who is currently utilizing said client computer system, said client computer system being coupled to a server computer system via a network, comprising:

a selected plurality of a plurality of BIOS modules and a particular set of BIOS settings associated with a particular user, wherein said selected plurality of said plurality of BIOS modules and said particular set of BIOS settings are preferred by said particular user to customize said client computer system when said client computer system is used by said particular user;

said server computer system for storing said associations in said server computer system;

said server computer system for downloading said selected plurality of said plurality of BIOS modules and said particular set of BIOS settings from said server computer system to said client computer system when said particular user causes said client computer system to start booting, wherein said particular user is a current user of said client computer system; and said client computer system being booted utilizing said downloaded BIOS modules and settings, wherein said client computer system is booted utilizing BIOS modules and settings received from said server computer system to customize said client computer system according to said particular user's preferences.

12. The system according to claim 11, further comprising:

a unique user identifier which identifies said particular user; and said server computer system for storing said associations in said server computer system utilizing said user identifier.

13. The system according to claim 11, further comprising said server computer system for storing said plurality of BIOS modules on said server computer system.

14. The system according to claim 11, further comprising:

for each potential user of said client computer system, a unique user identifier established which uniquely identifies each potential user;

for said each potential user of said client computer system, a selected plurality of said plurality of BIOS modules and a particular set of BIOS settings associated with said each potential user; and for said each potential user, said server computer system storing said associations in said server computer system utilizing said user identifier for each potential user.

15. The system according to claim 14, further comprising:

a lookup table in said server computer system for maintaining a listing of user identifiers, and selected BIOS modules and BIOS settings associated with each user identifier; and for said each potential user, said lookup table for storing said associations in said lookup table utilizing said user identifier.

16. The system according to claim 11, further comprising a lookup table established in said server computer system for maintaining a listing of user identifiers, and selected BIOS modules and BIOS settings associated with each user identifier.

17. The system according to claim 11, further comprising:

a unique user identifier which identifies each potential user of said client computer system; and for each potential user, said unique user identifier being stored on a removable device.

18. The system according to claim 17, further comprising for each potential user, said unique user identifier being stored on a smart card.

19. The system according to claim 11, further comprising:

said client computer system for determining a last user of said client computer system utilizing a user identifier stored in said client;

said client computer system for determining a current user of said client computer system utilizing a user identifier obtained from a smart card inserted into said client, wherein said user identifier of said current user is stored on said smart card;

said client computer system for determining whether said current user is the same as said last user; and in response to a determination that said current user is different from said last user, BIOS modules and settings preferred by said current user being downloaded.

20. The system according to claim 19, further comprising:

in response to a determination that said current user is different from said last user, said client computer system for transmitting a unique user identifier which identifies said current user to said server computer system;

said server computer system for determining BIOS modules and settings preferred by said current user;

said server computer system for transmitting said BIOS modules and settings to said client computer system; and said client computer system for booting utilizing said BIOS modules and settings.

* * * * *